(12) United States Patent
Piccionelli

(10) Patent No.: US 7,734,779 B1
(45) Date of Patent: Jun. 8, 2010

(54) PASSWORD PROTECTION SYSTEM AND METHOD

(76) Inventor: Gregory Alexander Piccionelli, 1925 Century Park East, Suite 2350, Los Angeles, CA (US) 90087

( * ) Notice: Subject to any disclaimer, the term of this patent is extended or adjusted under 35 U.S.C. 154(b) by 512 days.

(21) Appl. No.: 11/510,335

(22) Filed: Aug. 24, 2006

Related U.S. Application Data

(60) Provisional application No. 60/711,657, filed on Aug. 25, 2005.

(51) Int. Cl.
*G06F 15/173* (2006.01)

(52) U.S. Cl. ........................ 709/225; 709/217

(58) Field of Classification Search ............... 709/200, 709/203, 217–219, 225–226, 245; 726/2–5, 726/27
See application file for complete search history.

(56) References Cited

U.S. PATENT DOCUMENTS

| | | | | |
|---|---|---|---|---|
| 5,604,803 A * | 2/1997 | Aziz | ......................... | 713/155 |
| 6,154,172 A * | 11/2000 | Piccionelli et al. | ....... | 342/357.1 |
| 6,601,175 B1 * | 7/2003 | Arnold et al. | ................... | 726/7 |
| 7,035,626 B1 * | 4/2006 | Luciano, Jr. | ............. | 455/414.1 |
| 7,275,258 B2 * | 9/2007 | Arbab et al. | ................... | 726/6 |
| 7,353,234 B2 * | 4/2008 | Kimball et al. | ............. | 707/102 |
| 7,451,233 B2 * | 11/2008 | Parekh et al. | ............... | 709/245 |
| 7,496,669 B2 * | 2/2009 | Hirayama | .................... | 709/229 |
| 2002/0019828 A1 * | 2/2002 | Mortl | ........................ | 707/200 |
| 2002/0023010 A1 * | 2/2002 | Rittmaster et al. | ............ | 705/26 |
| 2002/0169829 A1 * | 11/2002 | Shuster | ....................... | 709/203 |
| 2003/0159066 A1 * | 8/2003 | Staw et al. | .................. | 713/201 |
| 2004/0243839 A1 * | 12/2004 | Bhatia et al. | ................. | 713/201 |
| 2005/0015604 A1 * | 1/2005 | Sundararajan et al. | ...... | 713/184 |
| 2005/0044378 A1 * | 2/2005 | Beard et al. | ................. | 713/182 |
| 2005/0213519 A1 * | 9/2005 | Relan et al. | .................. | 370/277 |
| 2006/0010252 A1 * | 1/2006 | Miltonberger et al. | ...... | 709/245 |
| 2006/0041655 A1 * | 2/2006 | Holloway et al. | ........... | 709/223 |
| 2006/0173793 A1 * | 8/2006 | Glass | .......................... | 705/75 |
| 2008/0058057 A1 * | 3/2008 | Lau et al. | ...................... | 463/17 |

* cited by examiner

*Primary Examiner*—Faruk Hamza

(57) ABSTRACT

A system and method for providing a password to a user on a network, the network having provider computer and a user computer, the provider computer comprising a password system configured to issue a password to a user of the user computer for use in accessing age-restricted content once a determination has been made that the user is age appropriate.

10 Claims, 7 Drawing Sheets

PASSWORD PROTECTION SYSTEM AND METHOD

RELATED APPLICATIONS

This application is related to, and claims priority from, provisional patent application Ser. No. 60/711,657, filed on Aug. 25, 2005, entitled "A Password Protection System and Method", and is fully incorporated herein by reference.

FIELD OF THE INVENTION

This invention is generally directed to a password protection system and method. More specifically, embodiments of the invention are directed to a password protection system that allows for the verification of a user's age by geolocational association of the user's presence in an adult's only location, and by other means, prior to the distribution of a password for use with age restricted materials.

BACKGROUND OF THE INVENTION

Many items available for sale or viewing via the Internet, such as sexually explicit materials, are age restricted and subject to other regulations such as federal and state obscenity laws and the federal record keeping and labeling laws (18 U.S.C. §2257, 18 U.S.C. §2257A, and 28 CFR Part 75 et seq.) applicable to sexually explicit materials. These and other laws not only restrict who can lawfully access or view restricted materials, but also, as in the case of sexually explicit materials, how mandatory records pertaining to the materials are to be maintained and how mandatory compliance statements are to be associated with such materials (See 28 CFR 75.6-75.8). Many activities such as online gambling and purchases of alcoholic beverages are likewise age restricted and subject to other specific regulations.

With respect to the management of mandatory records required by 18 U.S.C. §2257, 18 U.S.C. §2257A, and 28 CFR Part 75 et seq., producers of certain materials are required to create and maintain copies of certain records pertaining to depictions subject to the aforesaid regulations. This imposes a burden on such "producers", as that term is defined in 28 CFR Part 75.1, and on other persons and entities that "produce", as that term is defined in 18 U.S.C. §2257 (h) ("Producers"), such sexually explicit materials, such as X-rated DVDs, web sites containing such materials, adult-oriented online video chat and sexually explicit content distributed via mobile telephone devices, in that, some Producers are, in effect, distributors, re-publishers, re-issuers and creators of derivative works of such materials ("Secondary Producers") and such Secondary Producers usually do not have the original records pertaining to such materials as such records are almost always originally created and maintained by the Producers that actually originally create such materials ("Primary Producers"). Nevertheless, Secondary Producers are obligated to obtain such records to independently comply with the regulations pertaining thereto. Often the Primary Producers provide copies of the mandatory records required by the federal law for explicit materials to Secondary Producers. In many instances, this is difficult, time consuming and costly. For example, it is difficult, time consuming and costly to provide such records to video distributor e-trailers and other Secondary Producers that sell the Primary Producers' DVDs via the Secondary Producers' web sites, wherein the Secondary Producers display explicit trailers or explicit portions of the product packaging on the distributors' retail web sites, also known as e-tailing web sites. Further, broad distribution of the records to Secondary Producers, which include personal information of performers subjects the performers depicted in the subject material to potential identity theft and other violations of privacy rights.

Currently, many web sites containing age restricted materials or parts of the web site that are prohibited to minors, limit access to such materials or such parts of the web site through the use of passwords which are provided to users in association with the purchase of a membership with a credit card. Prepayment with credit cards has been a legally recognized effective means to restrict access to inappropriate materials by minors. It is, for example, a recognized means to restrict access to such materials set forth in the Child Online Protection Act.

Some web sites, for example, online video adult DVD distributors, however, typically do not require credit card prepayment-based age verification solely for the purpose of perusing the web site or the materials available for sale thereon. This is, in large part, a response to consumer preference not to provide credit card information merely to view advertisements relating to sexually explicit products and services. Consequently, if sexually explicit material is depicted on such web sites, such as, for example reproductions of backs of adult DVD boxes which commonly contain such depictions, the operators of such web sites are subject to potential prosecution under the Child Online Protection Act and other laws prohibiting the distribution of harmful matter or obscenity to minors.

A need in the industry exists to provide operators of such web sites with means to quickly and simply verify the adult status of viewers of such material. A further need in the industry exists to provide such means without requiring a consumer to disclose credit card information to merely view advertisements for sexually explicit material. Additionally, since the determination of whether sexually explicit material is obscene requires the application of the community standards applicable to the location from which or into which such material is transmitted, a further need exists to provide contractual and geographical limitation management over the distribution of such materials for the purpose of viewing an age-restricted movie trailers, video clips, advertisements or other similar matter that might be obscene or harmful to minors. A further need in the industry exists for a password system that allows the obtaining and use of a password or identification that allows the user to access a variety of restricted information and material resident on disparate and disassociated merchant venues, such as retail or distributor web sites. A still further need in the industry exists for a password system that allows a user to obtain and use a password or identification to access a variety of restricted information and material resident on disparate and disassociated merchants' venues, such as retail or distributor web sites.

Many adult entertainment web sites offering explicit sexual depictions for viewing by members offer "tours" of the subject web site as an enticement for visitors to purchase a membership to the web site. It is commonly understood in the online adult entertainment industry that tours containing sexually explicit materials are a more effective means of selling memberships to adult entertainment web sites offering sexually explicit content than tours that only comprise material that cannot be deemed to be harmful to minors. Consequently, a need in the industry exists to provide tours that contain sexually explicit materials to persons in a manner that restricts minor access to such tours. A further need in the industry exists to provide such tours in a manner that restricts minor access to such tours without requiring the use of a credit card.

Many web sites offering age-restricted content or other age-restricted products or services are promoted via affiliate marketing programs. Such affiliate marketing programs commonly involve the sending of Internet traffic or sales opportunities from one merchant web site, i.e., a "Traffic Sending Web Site", to another merchant web site, i.e., a "Traffic Receiving Web Site", in exchange for a "pay-per-click", a "pay-per-join" or other commission payment. Often such arrangements involving the marketing of online adult entertainment available on, at, or in association with the Traffic Receiving Web Site also involve the sending of Internet traffic from Traffic Sending Web Sites that contain sexually explicit depictions that might not be in compliance with all laws pertaining thereto, including laws that require that minors be prevented from accessing material inappropriate for minors. Consequently, affiliate marketing payments to such an affiliate operating a noncompliant Traffic Sending Web Site can expose the operator of the subject Traffic Receiving Web Site to substantial direct and/or vicarious criminal and civil liability. A need in the industry exists to provide operators of affiliate marketing programs and operators of Traffic Receiving Web Sites with affiliate marketing methods and participants that do not send traffic or sales leads to Traffic Receiving Web Sites in a manner that exposes a Traffic Receiving Web Site to such direct or vicarious criminal or civil liability.

SUMMARY OF THE DISCLOSURE

Embodiments of the system and method for providing a password to a user on a network, the network having provider computer and a user computer, the provider computer and user computer being in communication therebetween. The same provider computer comprising a password system configured to issue a password to a user of the user computer upon the determination of the age appropriateness of the user, the password system comprising a user interface, a storage database and a password manager. In some preferred embodiments, the password system further comprises an age verification system that is coupled to the network and accessible by the provider computer, or coupled to the provider computer. In one preferred embodiment, the age appropriateness of the user is determined by verifying that location information associated with the user computer is associated with an age restricted location, such as the interior of an adult book store, a bar or tavern, a gentleman's club or a casino.

A feature of some preferred embodiments of the password system is that the global positioning satellite ("GPS") information of the user computer is used to determine whether the user is in an age restricted location. An advantage to this feature is that the password system can verify through the use of locational information coupled with data regarding the likelihood that minors will be excluded by law or custom from the location to verify that the user is age appropriate without the need to require that the user provide credit card or other personally identifiable information to the password system.

The above and other advantages of embodiments of this invention will be apparent from the following more detailed description when taken in conjunction with the accompanying drawings. It is intended that the above advantages can be achieved by different aspects of the invention and that additional advantages of this invention will involve various combinations of the above independent advantages such that synergistic benefits may be obtained from combined techniques.

BRIEF DESCRIPTION OF THE DRAWINGS

The detailed description of embodiments of the invention will be made with reference to the accompanying drawings, wherein like numerals designate corresponding parts in the figures.

DETAILED DESCRIPTION OF THE PREFERRED EMBODIMENTS

Preferred embodiments of the present invention are directed to a password system and method that provides distributors (e.g., retailers, wholesalers, publishers), Primary Producers and Secondary Producers (which can be the same party) of regulated or restricted content and products, for example, video clips, images, movie trailers, digitized full-length motion pictures, live shows, video chat and the like, to more easily and effectively exhibit, publish, market, promote, advertise and sell such content to age appropriate consumers in compliance with applicable laws. For example, some preferred embodiments of the password system facilitate the publishing and sale of content in compliance with laws restricting the dissemination of such material to minors, the obscenity laws and the federal record keeping and labeling laws set forth at 18 U.S.C. §2257, 18 U.S.C. §2257A, and 28 CFR Part 75 et seq. In preferred embodiments, the dissemination of material is accomplished through the use of a password code. The password code can be obtained in a variety of ways, including, but not limited to, providing a password code in association with becoming a member in a third party web site whereby age verification is accomplished by or through such third party web site, verifying a user's physical location in a restricted location, such as a location that prohibits minor access to that location, purchasing a product or service with a credit card, debit card or other payment method recognized as a means of providing reasonable assurance that the person making the purchase is an adult, and use of a legally acceptable age verification system.

Figure 1:
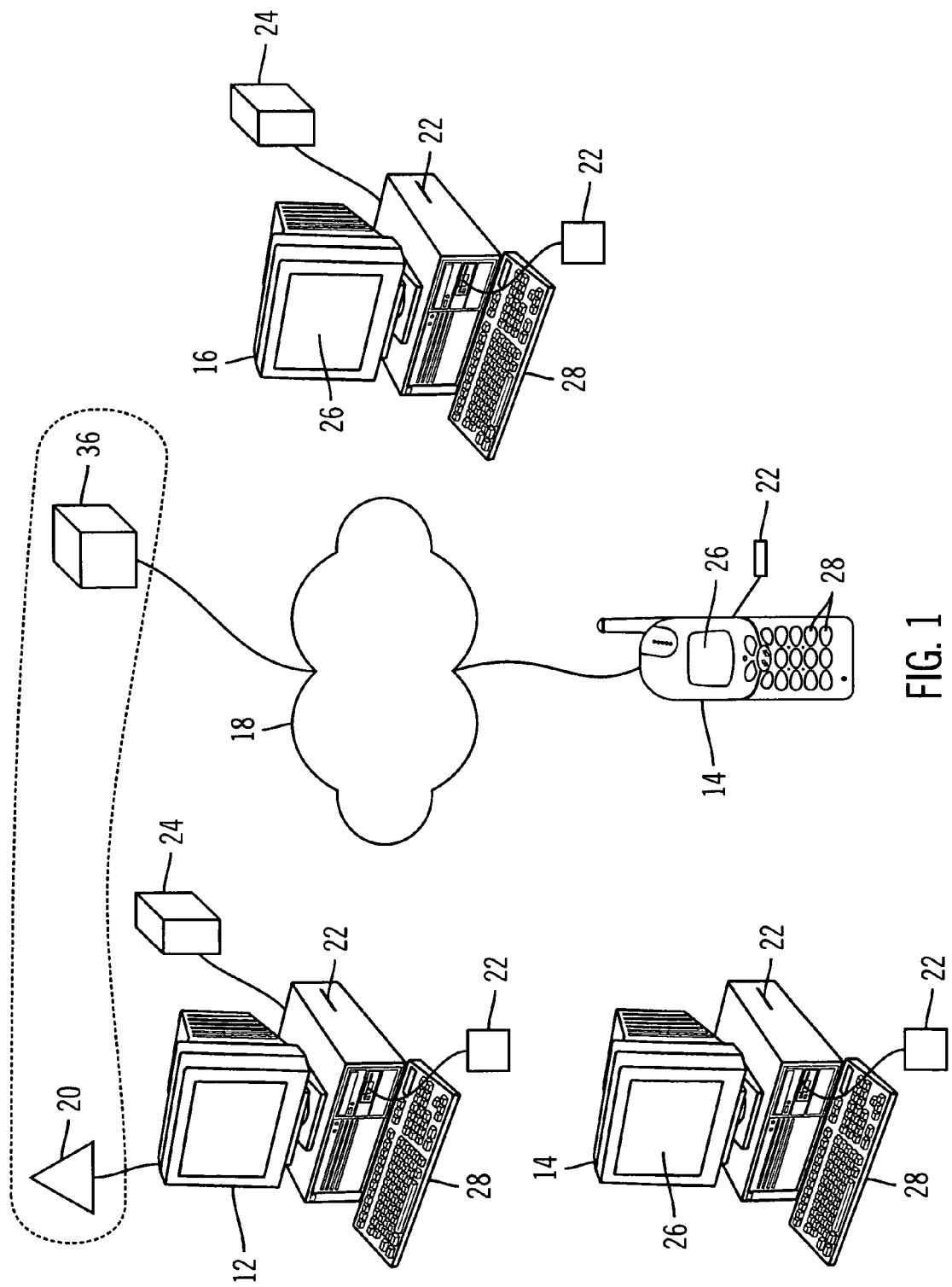
FIG. 1 is a network environment in accordance with a preferred embodiment of the invention.

Hardware Environment:

Preferred embodiments of the instant invention operate in accordance with a plurality of networked computers, such as, for example, a provider computer and a user computer that are coupled together on a communications network, such as, for example, the Internet, a mobile telephone network or a wide area network. FIG. 1 depicts a network system 10 that operates in accordance with preferred embodiments of the invention. With reference to FIG. 1, preferred embodiments of the password system 20 operate on the network 10, such as the Internet, comprising a server computer or provider computer 12, a client or user computer 14, and a third party computer 16, such as, a merchant computer, wherein the provider computer 12, the user computer 14, and third party computer 16 are coupled together via a communication link 18. The communication link 18 may include a public network, such as the Internet, a mobile telephone network, a local area network, or any other suitable communications connection, hardwired, wireless, or a hybrid thereof.

In some preferred embodiments, the network system 10 includes a plurality of either the provider computer 12, the user computer 14, the third party computer 16, or any combination thereof. FIG. 1 depicts two types of user computers 14, although any type and number of user computers are suitable. The provider computer 12 contains password information and other relevant data that may be accessible by the third party computer 16 or other parties having permission to access the provider computer. Preferably, the network 10 includes one or more (and preferably a plurality of) user computers 14 and third party computers 16 that are operatively connected to the communication link 18. It will be understood that network systems in accordance with further embodiments may include more than two provider computers 12.

The provider computer 12, or server, may comprise any suitable network device capable of providing content (data representing text, hypertext, photographs, graphics, haptic information, robotic control data, video and/or audio) for communication over the network. In preferred embodiments, the provider computer 12 comprises a programmable processor capable of operating in accordance with programs stored on one or more computer readable media 22 (for example, but not limited to, floppy disks, hard disks, random access memory RAM, CD-ROM, SIMS card), to provide content for communication to a user computer 14, third party computer 16, or other designated system. The provider computer 12 may comprise, for example, but not limited to, a personal computer, a mainframe computer, network computer, portable computer, personal digital assistant ("PDA") (such as, a 3Com Palm Pilot or a Blackberry), wireless device or the like. The provider computer 12 may include one or more internal data storage devices (not shown) for storing content for communication to a user computer 14, third party computer 16, or other designated system. Alternatively, or in addition, the provider computer 12 may be coupled to an external data storage device, computer or other means, generally represented at 24, from which the provider computer 12 may obtain content for communication to a user computer 14, third party computer 16, or other designated system. In one embodiment, the external device 24 may comprise a further network device coupled in the network 18. The provider computer 12 is controlled by suitable software to provide content to a requesting user computer 14, third party computer 16, or other designated system provided that various criteria are met. It will be understood by those skilled in the art that this process involves communications through suitable servers, routers and other components, as is dictated by the particular network environment.

The user computer 14 and third party computer 16 may comprise any suitable network device capable of communicating with other network devices in the network system. In preferred embodiments, the user and third party computers 14, 16, respectively, comprise a programmable processor capable of operating in accordance with programs stored on one or more computer readable media 22 (for example, but not limited to floppy disc, hard disc, computer network, random access memory (RAM), CD Rom, or the like), a display device 26 for providing a user-perceivable display (for example, but not limited to visual displays, such as cathode ray tube CRT displays, light-emitting-diode LED or liquid-crystal-diode LCD displays, plasma displays or the like, audio displays or tactile displays), and a user input device 28 (for example, but not limited to, a keyboard, mouse, microphone, keypad or the like, including virtual analogs of the foregoing). In one preferred embodiment, the user and third party computers 14, 16 comprise a personal computer system having a CRT display, a keyboard and a mouse user-input device. In another preferred embodiment, the user computer is a handheld device, such as a mobile telephone, PDA, computer gaming device, and iPod.

The user and third party computer 14, 16 are controlled by suitable software, including network communication and browser software to allow a user to request, receive and display information (or content) from or through a provider computer 12 on the network system 10. The user computers 14 are any means capable of communicating with the provider and third party computers 12, 16 including, but not limited, to personal computers, hand held devices, mobile telephones and wireless devices. The user computers 14 access the provider and third party computers 12,16 via the wide area network or through some other remote access, such as, for example, by telephone, facsimile, personal digital assistant, pulse code system, web TV, or any other device or method the communicates alpha numeric data with a server.

It is to be understood that the use of the term "computer" in this disclosure shall be broadly construed and shall, for example and without limitation also refer to mobile telephone devices, cable television or satellite television "set top boxes", IPTV devices, mobile entertainment devices such as iPods and MP3 devices, computer gaming devices, haptic devices, robots and robotic devices, and all other devices containing digital processing capability that are used in the providing of educational or entertainment content to consumers.

It is to be understood that the use of the term "network" in this disclosure shall be broadly construed and shall, for example and without limitation also refer to mobile telephone networks, cable television or satellite television networks, IPTV networks, networked mobile entertainment devices such as iPods and MP3 devices, networked computer gaming devices, networked haptic devices, networked robots and robotic devices, and all other networked devices containing digital processing capability that are used in the providing of educational or entertainment content to consumers that operate on or in association with a wired or a wireless network or a hybrid of wired and wireless networks.

GENERAL DESCRIPTION OF PREFERRED EMBODIMENTS

Preferred embodiments of the password system 20 allow for the obtaining of a password for the purpose of accessing and viewing restricted content or materials that are regulated by law or otherwise restricted. In preferred embodiments, the restricted content is resident on one or more third party computers 16, wherein the password may be used to lawfully access the restricted content or other restricted information on web sites offered by the third party computer 16. As discussed above, the third party computer 16 may be a merchant that offers goods and services via a web site or a series of web sites. It is to be understood that references to a third party web site may be interchanged with references to the third party computer, but both are intended to convey access to the third party computer 16.

Figure 2:
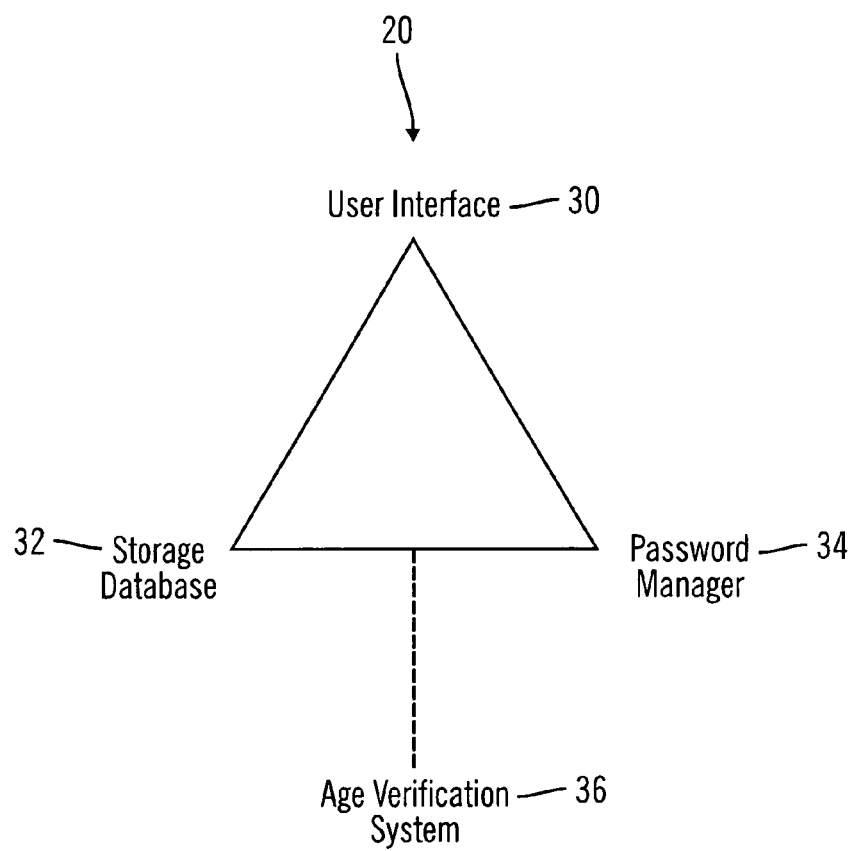
FIG. 2 is a schematic of a password system in accordance with the preferred embodiment of FIG. 1.

With reference again to FIG. 1, in preferred embodiments, the password system 20 resides on, or is coupled to, the provider computer 12. With reference to FIG. 2, the password system 20 comprises a user interface 30, a storage database 32 and a password manager 34. In some preferred embodiments, the password system further comprises an age verification system 36 that is coupled to the network and accessible by the provider computer 12, or coupled to the provider computer 12.

The user interface 30 is at least one web page, but can be a series of web pages or can be another user interface, such as a mobile telephone user interface, that is presented to the user. The user interface is configured to receive input data and in some embodiments includes any suitable means of accepting input data, including but not limited to, input boxes, pull down menus, or a combination thereof.

The storage database 32 is a storage medium that is configured to store input data and information related to the input data. The storage database is coupled to the provider computer, and can be a stand alone media, resident within the provider computer 12 or external device 24 of the provider computer, or coupled to the network and accessible by the provider computer 12.

The password manager 34 is a software program that is configured to generate, record, issue, distribute and manage passwords including validating passwords and setting expiration periods for the passwords. The password manager is configured to distribute a password to an individual user requesting a password and to issue password data, groups of passwords and/or password database updates to participating third party computers 16, and to store the associated information pertaining to the passwords and/or password data in the storage database 32. When a password is issued to an individual, the information pertaining to the individual and the time period for the expiration of the password is stored in association with the assigned password. Similarly, when a group of passwords are issued to a third party computer, the password manager 34 stores the identification of the third party computer in association with the group of passwords. As the passwords are issued to individual users, the password manager receives and updates information regarding the particular passwords and associated users.

The age verification system 36 is any suitable means for verifying a user's age, or at least, verifying that the user is age appropriate to view or purchase certain items, and can be coupled to, accessible by, or in communication with, the provider computer 12. In some preferred embodiments, the age verification system 36 transmits a notice regarding the age appropriateness of a user once a determination has been made.

In preferred embodiments, the age verification system is a software program or a set of code that provides rules or instructions to determine the age appropriateness of a user. For example, a rule that a user is age appropriate if a credit card is used or a rule that a user is age appropriate if the user is determined to be present at a known restricted location (discussed below), instructions to compare input user data with known data to determine age appropriateness of the user. For example, upon input of a driver's license by the user, the age verification system can verify the driver's license number against the department of motor vehicle database and retrieve birth date information. Other databases, including, but not limited to, a credit card database, social security database, and the like can also be used. In some preferred embodiments, the age verification system compares a user's known physical location (discussed below) against a database containing information regarding the global position, that is, location of establishments and other places which restrict access to minors to ascertain information which would reasonably verify that the user is age appropriate by virtue of the user's presence in a location in which minors are prohibited by law or custom. In some preferred embodiments, information allowing verification of a user's age can be resident within the password system, for example, stored within the database. In preferred embodiments, the password system can utilize a variety of methods to verify a user's age depending upon the circumstances in which a password is requested, as will be discussed below. In some preferred embodiments, the age verification system is a third party system that is accessible by, or in communication with, the password system.

Figure 3:
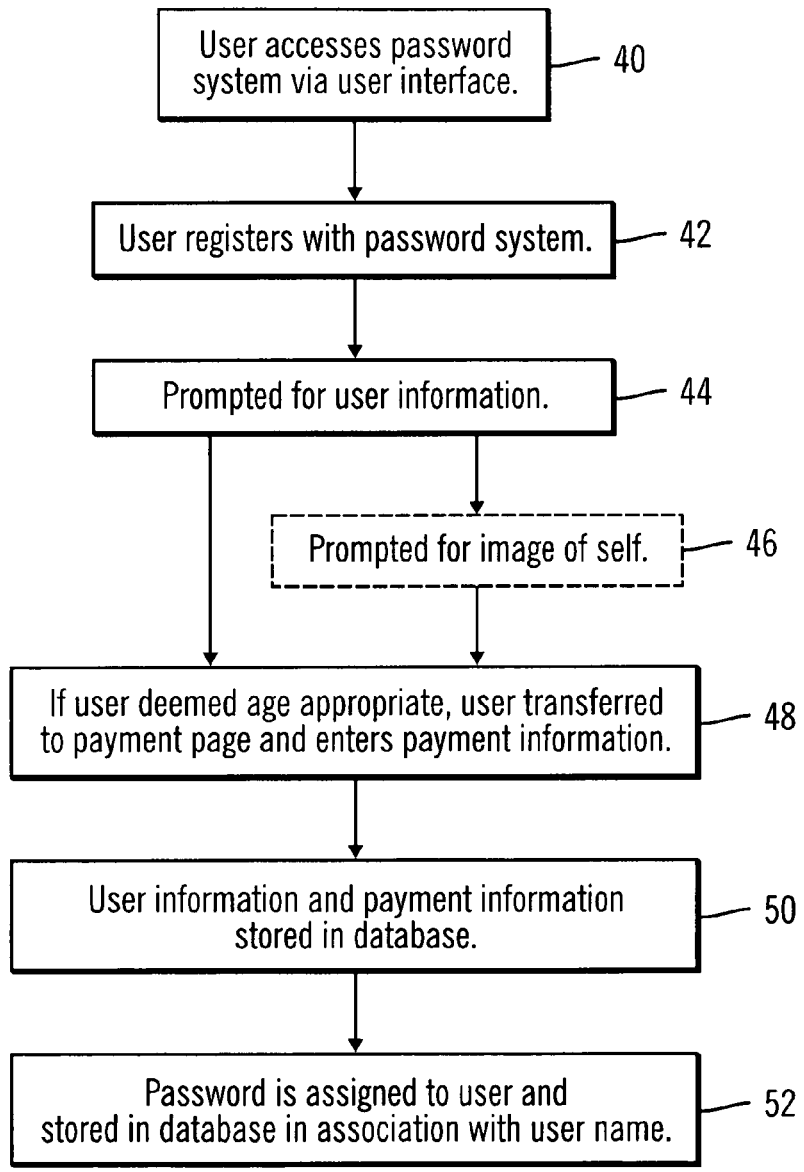
FIG. 3 is a block diagram depicting the process for issuing a password to a user in accordance with the preferred embodiment of FIG. 1.

As stated above, the issuance of a password can be accomplished by a variety of methods. With reference to FIG. 3, to obtain a password from the password system, a user accesses the password system via the user interface, such as a plurality of web pages 40. To obtain a password, the user registers or signs-up with the password system 42. The user is prompted for, and provides user information, including but not limited to, user name, address, electronic mail address, driver's license number, birth date and any other information predefined by the password system 44. In some preferred embodiments, the user is also prompted to provide an image of himself or herself to the provider's computer or a designated third party's age verification computer system 46. In some preferred embodiments, the user uses a still or video camera attached to the user computer to transmit the image to the provider computer or the designated age verification system. In some preferred embodiments, the user provides both a picture identification document or other identification materials, such as a still or video camera capture of himself or herself. In some preferred embodiments, a live operator can review the identification materials offered by the user. In some preferred embodiments the user's age is verified by use of examination of a user identification document, such as a driver's license remotely by videoconferencing means whereby a user computer transmits a video or still photograph of the user and/or the user's identification document over a network to a remote computer whereupon the video or still photograph is provided to the remote computer and displayed via a displayed means connected therewith to enable an operator of the remote computer to check or otherwise evaluate the identification document, including any data therein, such as the user's age, the user's photograph and other data provided in the identification document, and to check such data against the video or photograph of the user and/or other representations made by the user. In some preferred embodiments of the invention the user computer provides biometric information to the remote computer enabling the operator to compare the biometric data presented with one or more databases to enable the operator to establish the age or other identifying characteristics of the user. In still other embodiments, the age verification system employs redundant or non-redundant combinations of the methods above.

Once the user enters the user information, if the user is deemed to be age appropriate, the user is transferred to a payment page 48, wherein the user enters payment information, such as a credit card number. The manner of determining age appropriateness of the user is discussed more fully below. The user information, and payment information, is stored in the storage database in association with the user's name 50.

Once the user has entered payment information for the password, the password system assigns the user a password and stores the password in the storage database in association with the user and payment information 52. In some embodiments, the user is not given a password until the payment information is processed. In other embodiments, the password assigned to the user is temporary until the payment information is processed. If the payment information is incorrect or does not otherwise allow payment for the password, the password system disables the password. In some preferred embodiments, the user is provided with the password without requiring a payment or a payment step in the process of providing the password.

In preferred embodiments, the password is valid for a predefined period of time. If the user renews the password, for example, by paying a monthly or a yearly fee, the password remains active. If the user fails to renew the password, the password expires at the end of the predefined period of time, and the user must reapply for a new password, or in some embodiments, the user can reactivate the expired password.

In addition to directly obtaining the password from the password system, in other preferred embodiments, a user can obtain a password code from the third party computer 16 by purchasing unrestricted goods or services from the third party computer via a web site. Thus, the third party computers 16 can become distributors of the passwords.

In some preferred embodiments, the third party computer 16 can become members of the password system, and in some instances, become an affiliate member of the password system. The third party computer 16 registers with the password system as an affiliate by providing pertinent information, such as company name, address, electronic mail address, and the like, by any suitable means as are commonly understood by those reasonably skilled in the art. Once registered, the third party computer 16 is assigned a merchant identification code that is to be transmitted with any information transmitted from the third computer 16 to the password system.

Figure 4:
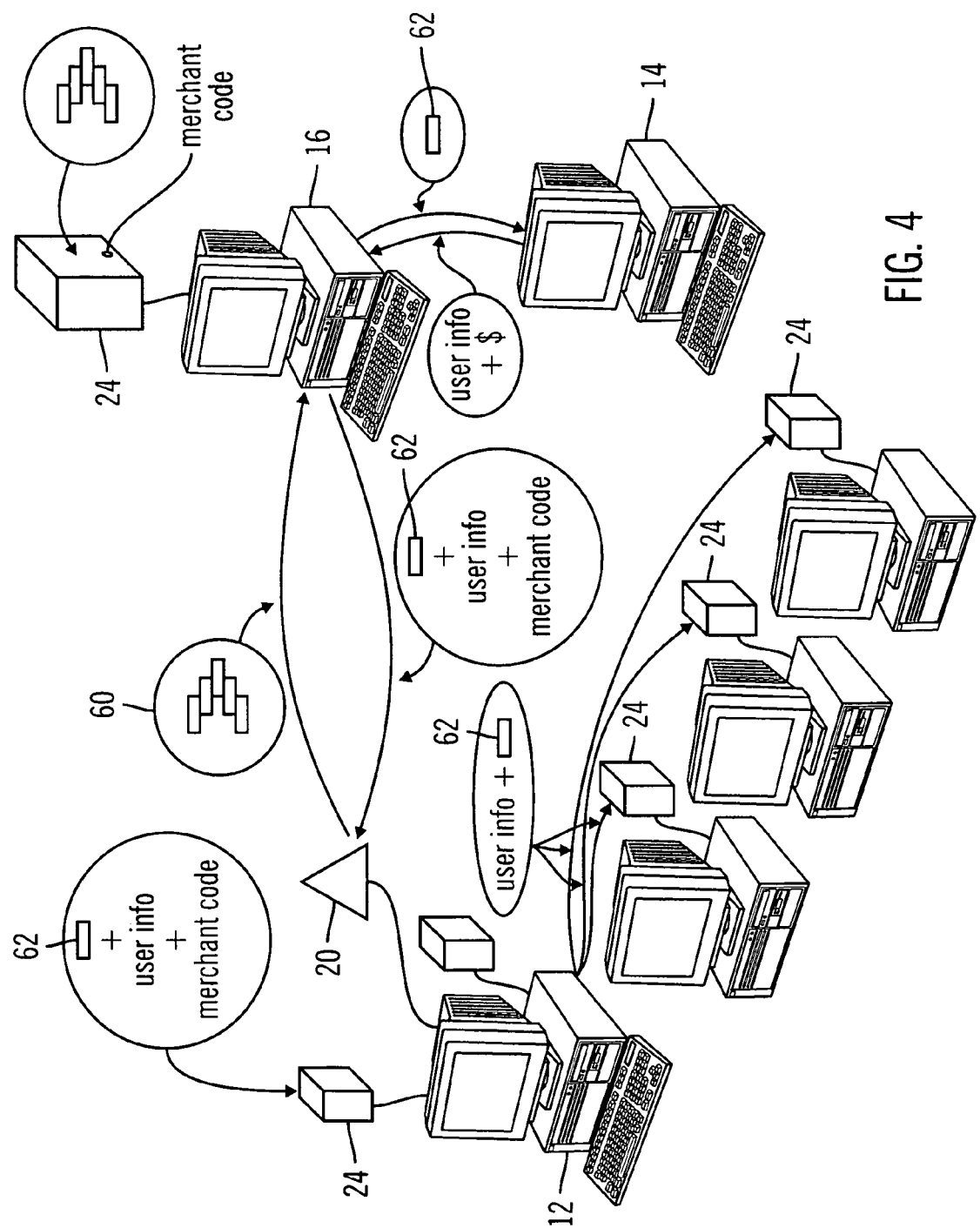
FIG. 4 is a schematic of a general operation of issuing passwords through the third party computers in accordance with the embodiment of FIG. 1.

With reference to FIG. 4, in some embodiments, the third party computer 16 is assigned a group of passwords 60 by the password system 20 that can be later assigned to users visiting the third party computer 16 under predefined conditions. In preferred embodiments, these passwords will only be valid for a predefined period of time. For example, a user accesses the third party web site, such as a web site offering the sale and delivery of flowers or liquor, and commences the purchase of an item. To purchase the item, the user may provide a credit card. In some embodiments, a credit card may be used to verify that the consumer is at least the age of majority and may be deemed to provide safe harbor protection that the user is an adult.

Once the third party computer determines the user is of valid age, the third party computer can transmit a request to the user asking if the user would like to receive a password. The user could then be issued a password 62 in accordance with preferred embodiments described herein. In another embodiment, the third party computer could simply assign and transmit a password to the user from the group of passwords it has been assigned from the password system. In either situation, since the issued password will only be valid for a predefined period of time, if a user desires to maintain the password, the user can access the password system and directly register with the password system. The user can then continue to pay for the password in accordance with the predefined period of validity, for example, thirty days. In some preferred embodiments the password does not expire.

In some preferred embodiments where a third party computer issues a password from a group of passwords provided to the third party computer by the password system, as each password is assigned to a user, the third party computer transmits a notice to the password system that the password has been assigned. Upon receipt of the notice from the third party computer, the password system activates the password. The activation of the password can occur regardless of whether the user registers with the password system. In some embodiments, the passwords are pre-activated by the password system when assigned to the third party computer, and the third party computer simply transmits the user information and merchant identification code with the assigned password to the password system. In preferred embodiments, the password system time stamps the commencement of the period of valid use of the password. In some embodiments, the period of validity for the password is activated once the user uses the password. In all instances, the password is assigned a predefined duration upon which it will expire.

With reference again to FIG. 4, after the password is assigned to the user, or substantially contemporaneously with such assignment, the databases of the provider computer 12 and all third party computers 16 participating in the password system are updated to reflect the newly assigned password, such that the newly assigned password is recognized and accepted by other third party computers 16. In some preferred embodiments only some of the third party computers participating in the password system are updated, for example in situations where a password is intended to provide access to a limited set of web sites. In some embodiments, the password given to the user by the third party computer is valid for a period of time less than the period assigned to passwords assigned to users by the password system. Further, to avoid users collecting passwords, in some embodiments, users cannot receive more than one password during a given period of time using the same payment method, that is, the same credit card and name. Further to avoid user sharing of passwords, in some embodiments the password system will temporarily or permanently terminate a password's usability if an attempt is made to contemporaneously use the password on more than one third party computer or if an attempt to use the password from more than one computer contemporaneously is made.

In preferred embodiments, because credit cards can be issued to minors, the credit card or other payment means can be coupled with additional age verification means. Suitable age verification means include, but are not limited to, showing of a driver's license via a video camera coupling the merchant and the user, or the merchant's agent and the user; faxing a copy of an identification document, such as a driver's license, evincing the name on the credit card as illustrated above; providing a social security or driver's license number or other identification document number which can be checked against one or more databases; attestation of age, such as a digital signature; a locational verification means as set forth below; and any other means suitable to establish the age of the user or the fact that the person will be deemed to be an adult for the purposes of certain laws, such as, for example, harmful matter and/or obscenity laws, including, but not limited to, the providing of valid credit card information. In some embodiments, regardless of whether the user presents a credit card, or otherwise establishes his age, the user can be issued an identification password as discussed above.

Figure 5:
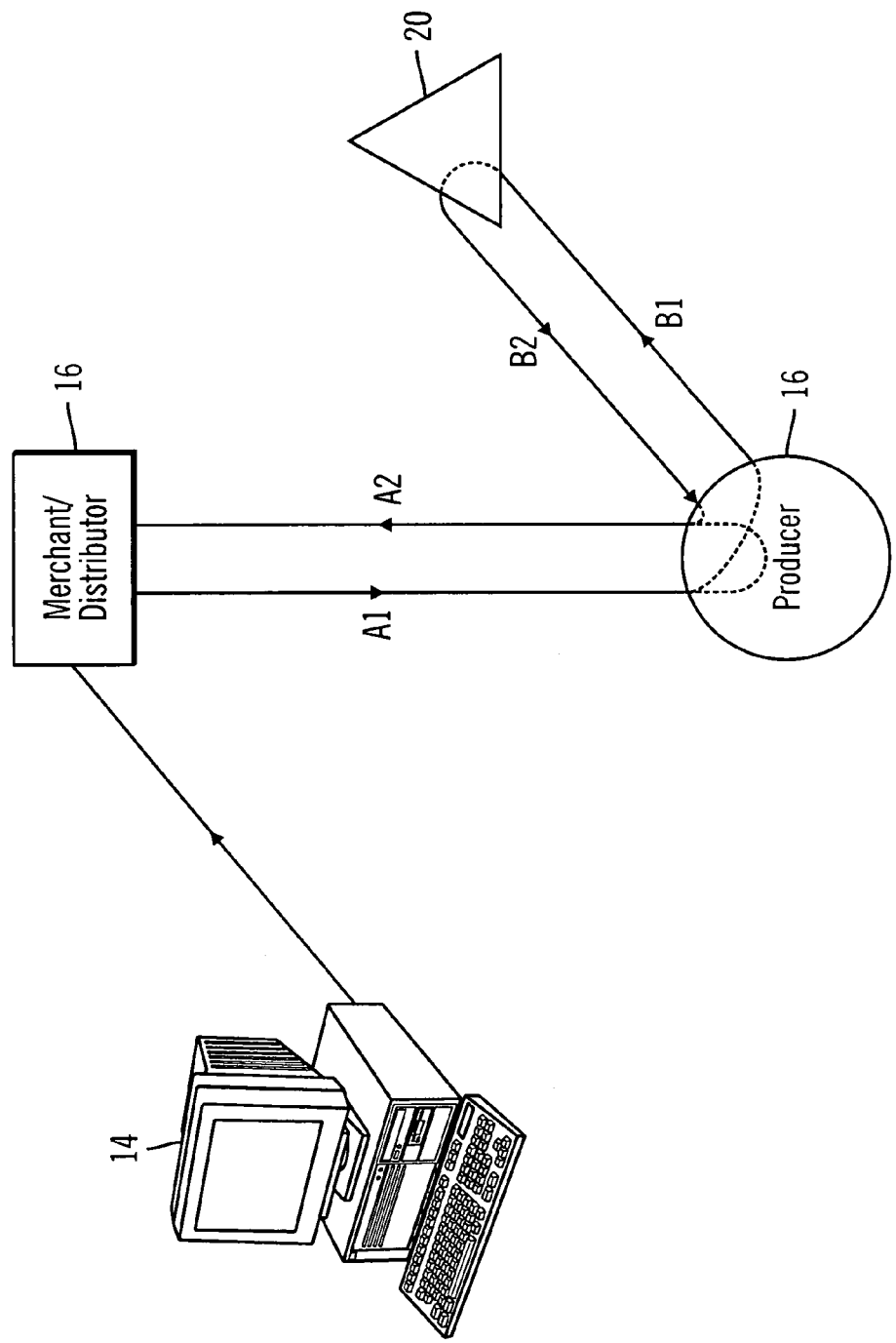
FIG. 5 is a schematic depicting the transferring of a user between third party computers upon the user's request to view restricted material.

The password system can be used in a variety of ways and can be coupled to the merchant or distributor offering a product or service for sale, the Producer or manufacturer of the product, both, or any combination thereof. With reference to FIG. 5, in some instances, the user can encounter limited information, such as advertising, which is appurtenant to a product or service the user may be interested in purchasing. For example, many Secondary Producers offering adult DVDs for sale via their web sites do so in conjunction with advertising on their web sites for the products, including a display of the product itself. In some instances, commercially effective advertisements for the products, such as trailers and some portions of the illustrations on the product boxes are age restricted or, if displayed on the distributor's web site would require the distributor to maintain federally mandated records associated with such advertisements pursuant to 18 U.S.C. §2257, 18 U.S.C. §2257A, and 28 CFR Part 75 et seq. For example, in accordance with current convention in the adult entertainment industry, illustrations of the back of most DVD shipper boxes contain explicit sexual depictions subject to 18 U.S.C. §2257 and 28 CFR Part 75 et seq. and/or/or 18 U.S.C. §2257A. If the user desires to see the back of the box or other explicit advertisements, such as trailers of the feature contained on the adult DVD that contain depictions of sexually explicit conduct, upon clicking on the 'back of the box' link or 'an adults-only trailer' link, the user is transmitted from the Secondary Producer third party computer (merchant/distributor) to the Primary Producer third party computer (content creator), i.e., appurtenant adult video content creator's web site or content server, wherein the user is advised that a password is required to view the material. In some embodiments, for clarification to the user, a message is displayed indicating that the user is "leaving the third party's (Secondary Producer's) web site and is being transmitted to the adult film company's (Primary Producer's) web site". In this regard, the Secondary Producer has no control over the content displayed on the Primary Producer's web site, thereby diminishing potential direct and vicarious liability for the Secondary Producer.

Once transmitted to the Primary Producer's web site A1, if the user has a password, the user enters the password and is allowed to view the material from the appurtenant adult video producer's (Primary Producer's) web site or content server, thereby relieving the distributor (Secondary Producer's) from the burdens associated with distribution of such materials from the distributor's web site, for example, the obligation to maintain the mandatory records associated with the aforesaid back of the box or trailers associated with the aforesaid DVD product offered for sale on the Secondary Producer's web site. In some preferred embodiments, after the user has viewed the restricted material on the adult video producer's (Primary Producer's) web site, the user is transported back to the distributor's (Secondary Producer's) web site A2. In some preferred embodiments for clarification to the user, a message is displayed indicating that the user is "leaving the adult film production company's (Primary Producer's) web site and is being transmitted back to the distributor's (Secondary Producer's) web site". In this regard, the Primary Producer has no control over the content displayed on the Secondary Producer's web site, thereby diminishing potential direct and vicarious liability for the Secondary Producer.

If the user does not have a password, and desires to view the material, in some embodiments, the user can purchase an unrestricted item from the Secondary Producer's web site and receive a password from the merchant, assuming the Secondary Producer merchant is a participant of the password system. Or, the user can be transmitted to the password system to obtain a password for use in conjunction with the adult video producer's (Primary Producer's) web site B1, wherein the user obtains the password as set forth above. Once the user has the password, the user is transmitted to the adult video producer's (Primary Producer's) web site or content server B2, where the user then enters the password and is allowed to view the material on the adult video producer's (Primary Producer's) web site or from the producer's server. In some preferred embodiments, after the user has viewed the material, the user is then transmitted back to the distributor's (Secondary Producer's) web site A2. It is to be understood that the user could initially directly access the web site of the Primary Producer of the product, instead of initially accessing the Secondary Producer's web site. In this instance, the user could obtain a password in the same manner as set forth above.

In some preferred embodiments the service marketed to a user on either the Secondary Producer or Primary Producer's web site is a membership in a web site. In some such instances the web site owner may provide a tour that comprises materials that are age restricted and/or subject to 18 U.S.C. §2257 and 28 CFR Part 75 et seq. and/or/or 18 U.S.C. §2257A. In some preferred embodiments the user may obtain password access to such tours in the same manner as described above with regard to access to the aforesaid trailers and/or the backs of DVD boxes.

Figure 6:
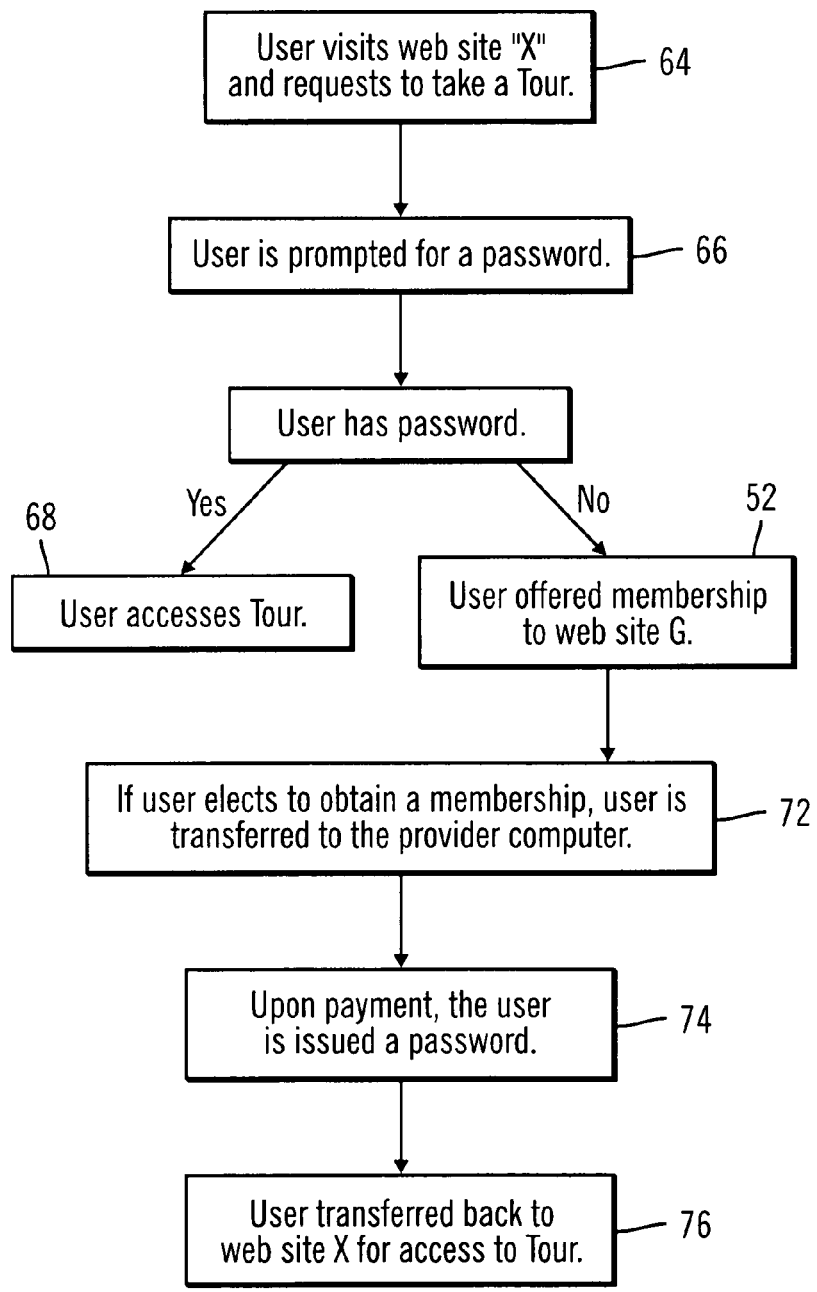
FIG. 6 is a block diagram of one preferred embodiment for the issuance of a password to a user.

For example, with reference to FIG. 6, in some preferred embodiments a user visits a web site, X owned and operated by a Primary Producer and desires to "take the tour" offered by the Primary Producer as a marketing mechanism to promote the sale of a membership in the Primary Producer's web site 64. Upon selecting the tour option the user is asked if the user has an appropriate password 66. If the user has a valid password, the user enters the password and can access the tour 68. If the user's response indicates that the does not have an appropriate password, the user is asked if the user would like to obtain a membership in web site G which will issue a password to the user which may be used to obtain access to web site X's tour 70. In some preferred embodiments, the user is advised that the password appurtenant to membership in web site G will provide the user with access to many adult's only tours of many adult's only web sites. If the user desires to obtain such a membership in web site G, the user is transferred to the provider computer, which, in some preferred embodiments offers a password protected web site membership to web site G on which there is no depictions of sexually explicit content 72. After the user purchases the membership with a credit card or debit card, thereby providing recognized indicia of the user's adult status, and the user is issued a password 74. The password databases of both web site G and web site X are contemporaneously updated to recognize the user password and to provide access to the corresponding password protected areas of the respective G and X web sites. The user is then transferred back to the location at web site X where the user was previously prompted to enter a password and is again prompted to enter a password 76. Upon entering the password that was newly acquired from web site G, the updated password recognition system of web site X recognizes the user password and provides access to the adult's only tour on web site X.

Continuing the previous example, in some preferred embodiments the user uses the password in two other web sites Y and Z, which are both participants in the password system. The user then uses the password provided by web site G to access adults-only tours thereon and, as a result of such marketing, the user purchases a membership in web site Z. In some preferred embodiments the owner of web site X is an affiliate participating in web site Z's affiliate marketing program. As a result of the user's purchase of a membership in web site Z after user's viewing of web site Z's adults only tour using the password obtained at web site G, web site Z will pay an affiliate marketing fee to web site X because web site X originally promoted the user's purchase of the membership in website G. In still further embodiments, web site G would obtain an affiliate marketing fee as well by virtual of web site G's participation in a multi-level affiliate marketing program operated by the owner of web site Z.

In other preferred embodiments, in circumstances where the Secondary Producer is a seller of "video-on-demand" ("VOD") performances of age or otherwise restricted prerecorded material subject to 18 U.S.C. §2257 and 28 CFR Part 75 et seq. and/or/or 18 U.S.C. §2257A the user may obtain a password to access such VOD performances in the same manner as described above with respect to access to the aforesaid trailers, backs of DVD boxes and web site tours.

Figure 7:
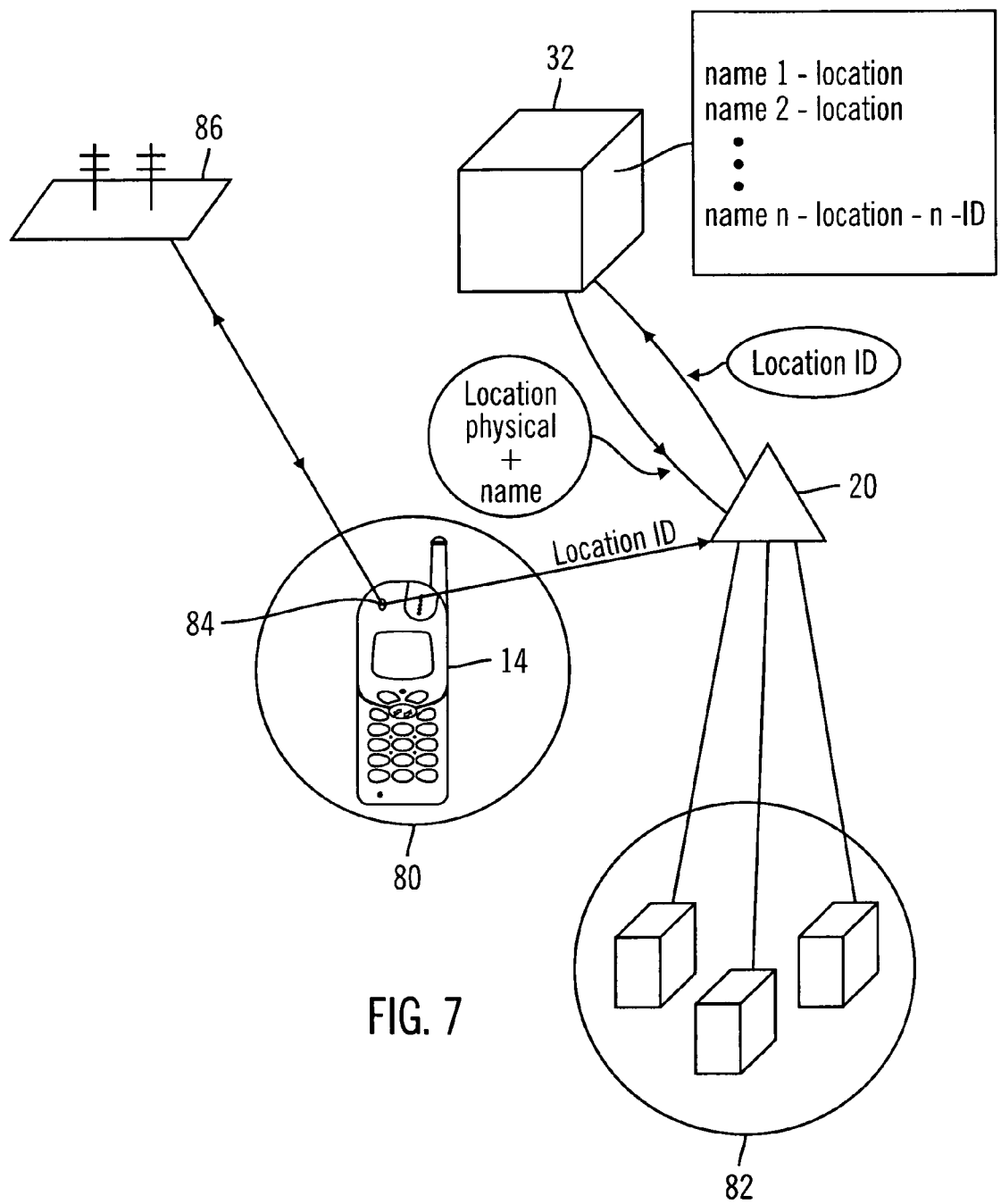
FIG. 7 is a schematic of the password system utilizing geophysical location information in accordance with the preferred embodiment of FIG. 1.

With reference to FIG. 7, in some preferred embodiments, the password system and method can be utilized to facilitate the distribution of restricted content to mobile user computers 14 such as, mobile telephones, other hand held devices, and other wireless devices. In some of these embodiments, a user is located in a specific location 80 that requires the exclusion of minors by law or custom or would otherwise be clearly recognized as a location restricted to "adults only". For example, inside an adult bookstore or adult DVD or video store, a gentleman's club, a bar, a nightclub or other place that serves alcoholic beverages, a casino, any "adult's only" section of a business or any other location in which minors are prevented from accessing. In these embodiments, the restricted location can register with the password system 20 such that its name, physical location and corresponding geophysical location data is stored in database 32 of the password system. Further, other third party databases 82 that maintain geophysical information for establishments and the corresponding global positioning satellite information can be utilized to provide such location data to the database of the password system.

In preferred embodiments, the geolocation of the user is used to determine whether a password can be issued by determining whether the user is located in an age restricted or regulated location 80. Methods of determining geolocation may include any reasonably effective means and in some preferred embodiments include those set forth in U.S. Pat. No. 6,154,172, which are incorporated herein by reference. In some preferred embodiments, age verification of the user can be accomplished by utilizing the attributes of the user's location, namely, the geolocational information of the user's specific physical location. In one preferred embodiment, the geolocational information of the user's hand held device, for example, a mobile phone can be used to "look up" the actual location of the user. In this example, and with reference to FIG. 7, the databases 32, 82 contain information pertaining to adult clubs, bars and the like with their corresponding geolocational information. The databases are accessible by the password system 20 to "match" the user's phone geolocation with the identification of the actual location. The databases can reside on the provider computer 12, or a designated third party computer 16, or other specified location, or can each reside in separate locations. In preferred embodiments, the user computer 14, that is, in this example, the mobile telephone transmits its geolocation information to the password system via the Internet or other network, such as a mobile telephone network or a combination thereof. If the password system can match the mobile phone's geolocation to the location of a known adult business or other location registered in the password system location database as a location that requires the exclusion of minors by law, a password can be automatically sent to the user via the mobile phone. In this example, a global positioning satellite ("GPS") location feature 84 of the mobile telephone can be used to obtain the geophysical location of the user from the global positioning satellite 86. The location data is transmitted to the password system or other computer and compared with the databases 32, 82 of location information corresponding to "adults only" locations. Thus, if the user is in an adult club, a bar, or the like, and location information corresponding to the adult club, bar, etc. is in the database, the password system can determine whether there is a "match". In this manner, the user can be reasonably deemed to be at a location restricted to adults only. If the password system can match the phone's geolocation to location information corresponding to a known adult business or an adults-only location, a password can be automatically sent to the user via the phone.

In further preferred embodiments of the password system and method, the fact that the user has been reasonably determined to have been in an adults only location can be subsequently used to provide reasonable indicia of the user's adult status to gain access to adults only web site tours, trailers and backs of boxes of DVDs displayed online which contain depictions that are inappropriate for minors, adult's only VOD, adult's only videoconferencing, and other adult's only products and services including, without limitation, alcoholic beverage sales and online gambling, via computers and web sites owned and/or operated by establishments and enterprises participating in the password system as well as via other computers and web sites providing direct access to such materials owned and/or operated by establishments and enterprises not participating in the password system except to utilize its geolocational adult status verification processes. In some preferred embodiments of the password system and method, operators of such web sites, establishments and enterprises unaffiliated with the password system except to use its geolocational adult status verification processes can access the password system to verify that the password is a genuine and bona fide password associated with the user. In this manner, an unlimited number of other persons and businesses can utilize the password system to provide a verification of the user's adult status. In some preferred embodiments, such persons and businesses can obtain access to the password system to verify the password by subscription payment, pay-per lookup or other payment means.

In some embodiments, a recordation of the fact that the user was determined to be associated with an adults only location can be stored in the storage database 32 or other designated database coupled to the password system. The recorded fact can be later retrieved by third parties desiring to determine whether the user is an adult as a condition to access goods or services restricted to adults. In some preferred embodiments, such access can be made available by subscription payment, pay-per lookup or other payment means.

In some preferred embodiments the locational means of verifying the user's presence in an adults-only location is accomplished by the user entering or otherwise providing a code or other data only reasonably visible or only otherwise reasonably obtainable at or within the adults-only location into the user computer 14, for example, on a mobile phone, lap top computer, PDA or a hand held device. For example, the code or other data may be displayed on a wall or a sign inside the location. In this example, the password system, or some other means coupled to the password system, can compare the code or other data is compared with a database associating the input information with the adults-only location. In some preferred embodiments the aforesaid code or other data changes frequently to prevent transmission of the code or data to persons that may not be adults outside the adult's only area.

In another embodiment, the user may be required to stand in a designated area to transmit the GPS information, or the user may be required to type in an answer to a question associated with the designated area, such as the color of the 'X' on the floor in the designated area. In these embodiments, users outside, but close by, the specified area (adults-only location) cannot use the GPS location to receive a password from the system in the event that the GPS resolution is insufficient such that an area outside the establishment is also deemed part of the establishment by GPS. These types of requirements are useful if the physical location of the identified adults-only location is small in size.

In still other embodiments, a code can be distributed to the user upon the verification of the user's age by a person at the adults-only location, that is, upon entry into the location. Further still, a user can enter the location and use a transmission means, such as a cell phone having a camera, to transmit an image of his face and driver's license to a party remotely checking the identification. It is to be understood that these examples are intended as illustrative, and are not required to be used in all embodiments, either individually or in combination. However, any single embodiment, variation or combination of the above examples is suitable for use in embodiments of the invention.

In some preferred embodiments, the business or merchant at, or owner, tenant or manager of the adults-only location can function as an affiliate in an affiliate marketing program. For example, if a user accesses the adults-only restricted promotional material, such as a web site tour, DVD trailers, VOD trailers or live videoconferencing promotion, resident on a third party computer or network utilizing an age verification system, method or process set forth herein, and the user purchases a product or services while present at the adults only location, or at another location after the user has been age verified by the user's presence at the adults only location, the business corresponding to the adults only location, as an affiliate would receive compensation, such as an affiliate marketing commission, for the sale of the good or service or for merely providing the sales opportunity (i.e., traffic).

Similarly, a web site business providing trailers as set forth above, could be an affiliate of an affiliate marketing program operated by an adults only establishment or it could be a web site comprising a part of the affiliate marketing program provider. For example, a retail DVD store could provide affiliate compensation to a provider of a trailer of a DVD to a user's cell phone, if the user purchases the DVD at the store in response to the viewing of a trailer provided by the trailer provider.

In general, the online industry, particularly the adult entertainment industry, substantially utilizes affiliate marketing means to promote the sale of web site memberships, DVDs, travel services, private one-on-one video conferencing and many other goods and services outside the adult entertainment industry. Traditionally the participants in such affiliate programs have been other web-based businesses. There is great competition amongst adult affiliate program and other affiliate program companies for qualified affiliate parties, including those individual parties who themselves have attained a legally appropriate age, to participate in such programs or operate or manage companies to participate in such programs. The industry has had a long felt need for additional such affiliates, including new affiliates from new sources of such affiliates. In some preferred embodiments of the password system and method, these needs can effectively be addressed by providing a means for virtually any party controlling an area restricting access to minors to become a participant in one or more such affiliate programs.

Further, if the age-restricted establishment is a bar or adult bookstore, state and local laws restricting ownership and/or operation of such establishments to adults, will provide an additional benefit to the affiliate marketing program in the form of reasonable assurance that the affiliate establishment person or company is controlled by an adult. In one example of preferred embodiments of the password system and method, a bar open to the public for dispensing alcoholic beverages only, an adults-only cabaret, or an adult book store can enable users presumed to be adults to have access via a mobile phone or other computer device at an age restricted location to lawfully obtain access to adults-only promotional content without additional age verification. If a sale of goods or services, such as a membership to an adults-only web site results from promotions viewed at the participating age-restricted location, an affiliate commission fee would be paid to the affiliate/operator of the age restricted location. Further embodiments include promotions by such affiliates to attract persons into the age-restricted establishment and/or to purchase goods or services marketed by the affiliate program. For example, a bar might provide a free drink to a patron in an affiliate bar in exchange for the patron obtaining a password or code as detailed above, or a drink might be provided for free if the patron purchase a membership to a web site or purchases some other good or service from the web site.

In further preferred embodiments of the invention, the type of location can be associated in the database with differing age restriction requirements. For example, an adult bookstore might be age-restricted to persons over the age of 18 years, while presence in an establishment serving alcoholic beverages might be age-restricted to persons over the age of 18, 19, 20 or 21 years, or some other age depending on the local regulations pertaining to the dispensing of alcoholic beverages. Thus, the password system and method can also provide a flexible means of providing a check on, or the legal establishment of, a person's age. Further embodiments of the invention provide a linkage with other data, such as databases and videographic transmission of the person's image and/or identification document(s) as further means of legally verifying the subject person's age.

In further preferred embodiments of the invention, the geolocational adult status/age verification systems, methods and processes described herein can be used to provide a means of verifying the age of persons seeking to engage in online gambling and other age restricted activities and that such systems, methods and processes can be combined with other systems, methods and processes to apply rule sets, such as those which enable the implementation of specific laws appurtenant to specific locations, including, without limitation, laws pertaining to gambling, distribution of licensed content, location restricted marketing, and location restricted sales of goods.

Although the foregoing describes the invention with preferred embodiments, this is not intended to limit the invention. Indeed, the foregoing is intended to cover all modifications and alternative constructions falling within the spirit and scope of the invention.

What is claimed is:

1. A method for providing a password to a user on a network, the network having a provider computer and a user computer, the provider computer and the user computer being in communication there between, the provider computer is configured to issue the password to the user of the user computer for use in accessing an age-restricted content, comprising:

receiving, at the provider computer, a request from the user computer for accessing a password system;

receiving, at the password system, location information corresponding to a location of the user computer;

determining age appropriateness of the user by verifying that the location information associated with the user computer is associated with at least one age restricted location;

transmitting, from the provider computer, the password to the user computer upon verifying that the location information associated with the user computer is associated with the at least one age restricted location; and associating a time period with the password, the password being valid during the time period and expiring upon expiration of the time period;

wherein verifying that the location information associated with the user computer is associated with the at least one age restricted location comprises receiving user provided data from the user, the user provided data corresponding to the user's response to a question associated with data displayed in the at least one age restricted location, wherein the data displayed in the at least one age restricted location is changed over time.

2. The method as claimed in claim 1, wherein the user computer is a hand held device.

3. The method as claimed in claim 1, wherein the location information is global positioning satellite information, and wherein determining age appropriateness further comprises:

receiving, from the user computer, the global positioning satellite information associated with the user computer; and comparing the global positioning satellite information of the user computer to a database comprising identifying known age restricted locations and their associated global positioning satellite information.

4. The method as claimed in claim 1, further comprising:

storing first data in a database at a first time, the first data representing that a determination has been made that the user was in the at least one age restricted location;

wherein determining age appropriateness of the user comprises determining, at a second time that is later than the first time, whether the user is considered of an appropriate age by determining if the first data is stored in the database.

5. The method as claimed in claim 1, wherein the data displayed in the at least one age restricted location comprises data visible or obtainable only in the at least one age restricted location.

6. The method as claimed in claim 1, further comprising allowing access to the age-restricted content to the user upon the user having the valid password and inhibiting access to the age-restricted content to the user upon the user having the expired password.

7. A password providing system configured to issue a password to a user of a user computer for use in accessing age-restricted content, comprising the user computer and at least one processor for connection on a network and configured to:

receiving a request for the password from the user computer on the network;

receiving location information corresponding to a location of the user computer from which request for the password is received;

determining age appropriateness of the user of the user computer by verifying that the location information associated with the user computer is associated with at least one of age restricted location;

transmitting the password to the user computer upon verifying that the location information associated with the user computer is associated with the at least one age restricted location; and associating a time period with the password, the password being valid during the time period and expiring upon expiration of the time period;

wherein verifying that the location information associated with the user computer is associated with the at least one age restricted location comprises receiving user provided data from the user, the user provided data corresponding to the user's response to a question associated with data displayed in at least one of the age restricted location, wherein the data displayed in the at least one age restricted location is changed over time.

8. The system as claimed in claim 7, wherein the at least one processor is further configured to:

storing first data in a database at a first time, the first data representing that a determination has been made that the user was in the at least one age restricted location;

wherein determining age appropriateness of the user comprises determining, at a second time that is later than the first time, whether the user is considered of an appropriate age by determining if the first data is stored in the database.

9. The system as claimed in claim 7, wherein the data displayed in the at least one age restricted location comprises data visible or obtainable only in the at least one age restricted location.

10. The method system as claimed in claim 7, wherein the at least one processor further configured to allow access to the age-restricted content to the user upon the user having the valid password and inhibit access to the age-restricted content to the user upon the user having the expired password.

* * * * *